(12) United States Patent
Yang

(10) Patent No.: US 10,965,374 B2
(45) Date of Patent: Mar. 30, 2021

(54) COMMUNICATION SYSTEM BETWEEN ELECTRONIC DEVICES, METHOD OF COMMUNICATION BETWEEN ELECTRONIC DEVICES, AND ELECTRONIC DEVICE

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/847,209

(22) Filed: Apr. 13, 2020

(65) Prior Publication Data
US 2020/0328808 A1    Oct. 15, 2020

(30) Foreign Application Priority Data
Apr. 15, 2019 (CN) .......................... 201910299275.2

(51) Int. Cl.
H04B 10/112 (2013.01)
H04B 10/50 (2013.01)
H04B 10/114 (2013.01)

(52) U.S. Cl.
CPC ......... *H04B 10/112* (2013.01); *H04B 10/114* (2013.01); *H04B 10/1129* (2013.01); *H04B 10/502* (2013.01)

(58) Field of Classification Search
CPC ..................... H04B 10/11–118; H04B 10/502
See application file for complete search history.

(56) References Cited

U.S. PATENT DOCUMENTS

| 10,097,264 B2 | 10/2018 | Venugopalan Nair Jalakumari et al. |
| 2005/0057169 A1* | 3/2005 | Noguchi ............ H04B 10/1143 315/150 |

(Continued)

FOREIGN PATENT DOCUMENTS

| CN | 104869252 A | 8/2015 |
| CN | 105472779 A | 4/2016 |

(Continued)

OTHER PUBLICATIONS

International Search Report, International Application No. PCT/CN2020/084891, dated Jul. 15, 2020 (8 pages).

(Continued)

*Primary Examiner* — Casey L Kretzer

(57) ABSTRACT

A communication system between electronic devices includes a first electronic device and a second electronic device. The first electronic device includes a LED array working within an infrared spectrum and a first LiFi transmission module driving and connected to the LED array. The first LiFi transmission module codes data to be transmitted to generate coded data and send the coded data via the LED array. A PD array of the second electronic device is opposing to the LED array and works within the infrared spectrum. A second LiFi transmission module driving the PD array is connected to the PD array and decodes the coded data received by the PD array to obtain the transmitted data.

17 Claims, 5 Drawing Sheets

(56) References Cited

U.S. PATENT DOCUMENTS

| | | | |
|---|---|---|---|
| 2012/0230685 A1* | 9/2012 | Jung | H04B 10/58 398/43 |
| 2013/0101285 A1* | 4/2013 | Shar | H04B 10/1149 398/38 |
| 2014/0064739 A1* | 3/2014 | Chen | H04B 10/1143 398/130 |
| 2016/0294472 A1 | 10/2016 | Palmer et al. | |
| 2017/0187456 A1 | 6/2017 | Siessegger et al. | |
| 2017/0257918 A1 | 9/2017 | Ansart et al. | |
| 2018/0219624 A1* | 8/2018 | Tsang | H04B 10/1149 |
| 2018/0302159 A1 | 10/2018 | Ritchie | |
| 2019/0028194 A1 | 1/2019 | Arrazat et al. | |

FOREIGN PATENT DOCUMENTS

| | | | |
|---|---|---|---|
| CN | 106043104 A | 10/2016 | |
| CN | 106253983 A | 12/2016 | |
| GB | 2565199 A | 2/2019 | |
| WO | 2019020395 A1 | 1/2019 | |

OTHER PUBLICATIONS

European Search Report, European Application No. 20169623.5, dated Sep. 21, 2020 (9 pages).

* cited by examiner

COMMUNICATION SYSTEM BETWEEN ELECTRONIC DEVICES, METHOD OF COMMUNICATION BETWEEN ELECTRONIC DEVICES, AND ELECTRONIC DEVICE

CROSS-REFERENCE TO RELATED APPLICATION(S)

The present application claims priority to Chinese Patent Application No. 201910299275.2, filed on Apr. 15, 2019, the content of which is hereby incorporated by reference in its entirety.

TECHNICAL FIELD

The present disclosure relates to the field of communication, and in particular to a communication system between electronic devices, a method of communication between electronic devices, and an electronic device.

BACKGROUND

As communication technologies between electronic devices develop rapidly, an electronic device capable of performing data transmission via light fidelity (LiFi) has appeared.

During performing data transmission via LiFi, a transmission distance of a visible light may be limited, and therefore, a transmission distance of data may be limited.

SUMMARY

According to a first aspect of the present disclosure, a communication system between electronic devices is provided and includes a first electronic device and a second electronic device. The first electronic device includes: a light emitting diode (LED) array, configured to be capable of working within an infrared spectrum; and a first light fidelity (LiFi) transmission module, configured to drive the LED array, wherein the first LiFi transmission module is connected to the LED array, and is configured to code data to be transmitted to generate coded data and to send the coded data via the LED array. The second electronic device includes: a photo diode (PD) array, configured to be capable of being aligned with the LED array and be capable of working within the infrared spectrum; and a second LiFi transmission module, configured to drive the PD array, wherein the second LiFi transmission module is connected to the PD array, and is configured to decode the coded data received by the PD array to obtain the transmitted data.

According to a second aspect of the present disclosure, a method of communication between electronic devices is provided. The method is performed by an electronic device including a LED array and a first LiFi transmission module. The method includes: coding, by the first LiFi transmission module, data to be transmitted to generate coded data; and sending the coded data via the LED array, wherein the LED array is able to work within an infrared spectrum.

According to a third aspect of the present disclosure, an electronic device is provided and includes: a LED array, configured to be capable of working within an infrared spectrum; and a first LiFi transmission module, configured to code data to be transmitted to generate coded data and send the coded data via the LED array.

BRIEF DESCRIPTION OF DRAWINGS

Aspects and advantages of the above-mentioned description and/or any addition aspects and advantages of the present disclosure may be clarified and may be easily understood by referring to the drawings.

DETAILED DESCRIPTION

Figure 1:
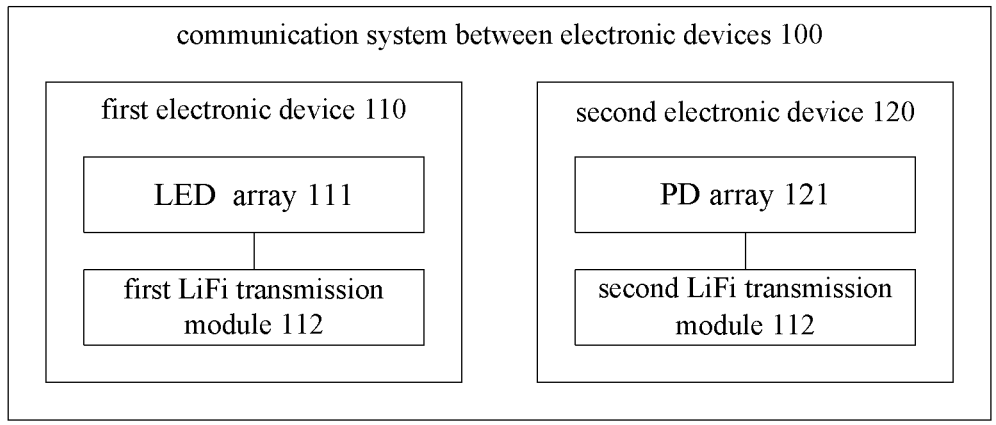
FIG. 1 is a structural diagram of a first communication system between electronic devices according to an embodiment of the present disclosure.

Embodiments of the present disclosure may be illustrated in detail hereinafter, and examples of the embodiments may be shown in the drawings. A same or similar reference number may indicate a same or similar element or elements having a same or similar function. The embodiments described by referring to the drawings are examples for explaining the present disclosure, but not to limit the present disclosure.

A communication system between electronic devices according to the embodiments of the present disclosure may be described by referring to the drawings.

In the embodiments of the present disclosure, an electronic device may be a hardware device having any operating system, a touch screen, and/or a display, such as a smart phone, a tablet computer, a personal digital assistant, a wearable device, and the like.

According to a first aspect of the present disclosure, a communication system between electronic devices is provided and includes a first electronic device and a second electronic device. The first electronic device includes: a light emitting diode (LED) array, configured to be capable of working within an infrared spectrum; and a first light fidelity (LiFi) transmission module, configured to drive the LED array, wherein the first LiFi transmission module is connected to the LED array, and is configured to code data to be transmitted to generate coded data and to send the coded data via the LED array. The second electronic device includes: a photo diode (PD) array, configured to be capable of being aligned with the LED array and be capable of working within the infrared spectrum; and a second LiFi transmission module, configured to drive the PD array, wherein the second LiFi transmission module is connected to the PD array, and is configured to decode the coded data received by the PD array to obtain the transmitted data.

In some embodiments, the first electronic device further includes: a distance detector, configured to detect a distance between the first electronic device and the second electronic device; and a focal length adjuster, configured to adjust a focal length of the LED array, wherein the first LiFi transmission module is configured to control the focal length adjuster to adjust the focal length of the LED array based on the distance between the first electronic device and the second electronic device.

In some embodiments, in response to the distance between the first electronic device and the second electronic device being smaller than a first threshold distance, the first LiFi transmission module is configured to control the focal length adjuster to adjust the focal length the LED array to be a first focal length and drive the LED array to send the coded data through the first focal length; and in response to the distance between the first electronic device and the second electronic device being greater than a second threshold distance, the first LiFi transmission module is configured to control the focal length adjuster to adjust the focal length of the LED array to be a second focal length and drive the LED array to send the coded data through the second focal length, wherein the second threshold distance is greater than the first threshold distance, and the second focal length is greater than the first focal length.

In some embodiments, the first electronic device further includes: a light-emitting angle adjuster, configured to adjust a light-emitting angle of the LED array. The first LiFi transmission module is further configured to obtain the number of second electronic devices communicating with the first electronic device and control the light-emitting angle adjuster to adjust the light-emitting angle of the LED array based on the number of second electronic devices.

In some embodiments, in response to the number of second electronic devices being smaller than a threshold number, the first LiFi transmission module is configured to control light-emitting angle adjuster to adjust the light-emitting angle of the LED array to be a first light-emitting angle and drive the LED array to send the coded data within the first light-emitting angle; and in response to the number of second electronic devices being greater than a threshold number, the first LiFi transmission module is configured to control the light-emitting angle adjuster to adjust the light-emitting angle of the LED array to be a second light-emitting angle and drive the LED array to send the coded data within the second light-emitting angle, wherein the second light-emitting angle is greater than the first light-emitting angle.

In some embodiments, the first electronic device further includes: an indicator, configured to emit a visible light. The visible light is configured to indicate a direction of a light emitted from the LED array.

In some embodiments, the LED array and the PD array are respectively arranged at an end of the first electronic device and an end of the second electronic device.

According to a second aspect of the present disclosure, a method of communication between electronic devices is provided. The method is performed by an electronic device including a LED array and a first LiFi transmission module. The method includes: coding, by the first LiFi transmission module, data to be transmitted to generate coded data; and sending the coded data via the LED array, wherein the LED array is able to work within an infrared spectrum.

In some embodiments, the sending the coded data via the LED array includes: detecting a distance between the electronic device and a second electronic device. The second electronic device is communicating with the electronic device. In response to the distance between the electronic device and the second electronic device being smaller than a first threshold distance, sending the coded data through a first focal length. In response to the distance between the electronic device and the second electronic device being greater than a second threshold distance, sending the coded data through a second focal length, wherein the second threshold distance is greater than the first threshold distance, and the second focal length is greater than the first focal length.

In some embodiments, the sending the coded data via the LED array further includes: obtaining the number of second electronic devices communicating with the electronic device. In response to the number of second electronic devices being smaller than or equal to a threshold number, sending the coded data within a first light-emitting angle. In response to the number of second electronic devices being greater than the threshold number, sending the coded data within a second light-emitting angle, wherein the second range of the light-emitting angle is greater than the first range of the light-emitting angle.

In some embodiments, the electronic device further includes an indicator, and the indicator emits a visible light to indicate a direction of light emitted from the electronic device.

In some embodiments, the second electronic device includes a PD array and a second LiFi transmission module. After the sending the coded data via the LED array, the method further includes: receiving, by the PD array of the second electronic device, the coded data; and decoding, by the second LiFi transmission module, the coded data to obtain transmitted data.

In some embodiments, the electronic device further includes the PD array and the second LiFi transmission module, and the second electronic device further includes the LED array and the first LiFi transmission module. The method further includes: coding, by the first LiFi transmission module in the second electronic device, data to be transmitted to generate the coded data; sending, via the LED array in the second electronic device, the coded data to the electronic device; receiving, by the PD array in the electronic device, the transmitted coded data; and decoding, by the second LiFi transmission module in the electronic device, the coded data to obtain the transmitted data.

In some embodiments, the LED array and the PD array are arranged at an end of the electronic device, and the LED array and the PD array are arranged at an end of the second electronic device.

According to a third aspect of the present disclosure, an electronic device is provided and includes: a LED array, capable of working within an infrared spectrum; and a first LiFi transmission module, configured to code data to be transmitted to generate coded data and send the coded data via the LED array.

In some embodiments, the electronic device further includes a focal length adjuster, configured to adjust a focal length of the LED array.

In some embodiments, the electronic device further includes a light-emitting angle adjuster, configured to adjust a light-emitting angle of the LED array.

In some embodiments, the electronic device further includes an indicator, configured to emit a visible light, wherein the visible light is able to indicate a direction of a light emitted from the LED array.

In some embodiments, the LED array is capable of aligning with a PD array arranged in another electronic device to send the coded data to the PD array of the another electronic device; and the another electronic device is capable of being arranged with a second LiFi transmission module decoding the coded data received by the PD array to obtain the transmitted data.

In some embodiments, the LED array and the PD array are respectively arranged at an end of the electronic device and an end of the another electronic device.

The communication system between electronic devices according to the embodiments of the present disclosure may include a first electronic device and a second electronic device.

The first electronic device may include: a light emitting diode (LED) array and a first light fidelity (LiFi) transmission module driving the LED array.

The second electronic device may include: a photo diode (PD) array and a second LiFi transmission module driving the PD array.

As an example, FIG. 1 provides a structural view of a first communication system between electronic devices.

As shown in FIG. 1, the communication system 10 between electronic devices may include a first electronic device 110 and a second electronic device 120.

The first electronic device 110 may include a LED array 111 and a first LiFi transmission module 112, and the first LiFi transmission module 112 may be connected to the LED array 111.

Under a potential situation, the LED array 111 may be arranged at an end of the first electronic device 110.

In the present embodiment, the LED array 111 may be arranged to work within an infrared spectrum, improving a transmission distance of data. The first LiFi transmission module 112 driving the LED array 111 may be arranged to code data to be transmitted to generate coded data, and arranged to transmit the coded data via the LED array 111.

In response to data modification or lost during transmission, the communication may be treated as a failed communication. Therefore, the data to be transmitted may be coded to guarantee validity of data transmission.

To be noted that, an underlying layer of a LiFi protocol may be compatible with a WiFi802.11 baseband. During data transmission, with a time division dual (TDD) protocol of wireless fidelity (WiFi), one-to-many transmission or many-to-one transmission may be achieved, and security of data transmission may be achieved during LiFi transmission, because a visible light may travel along a straight line only, only a user located on a straight travel path of the visible light may be able to intercept the transmitted data. As the LiFi transmission has a low latency, the LiFi transmission may be applied in a scenario requiring fast transmission of data, such as a fast file sharing, exchanging contact information, video sharing, and the like.

The second electronic device 120 may include a PD array 121 and a second LiFi transmission module 122.

Under a potential situation, the PD array 121 may be arranged at an end of the second electronic device120.

In the present embodiment, the second electronic device 120 may include the PD array 121, aligning with the LED array 111 of the first electronic device 110, and the PD array may also be able to work with the infrared spectrum. The second LiFi transmission module 122 for driving the PD array may be arranged to connect to the PD array 121, and may be arranged to decode the coded data received by the PD array 121 to obtain the transmitted data.

Specifically, during data transmission between electronic devices, the first LiFi transmission module 112 of the first electronic device 110 may be arranged to code the data to be transmitted to generate the coded data and send the coded data via the LED array 111. After the PD array 121 of the second electronic device 120 receives the coded data, the second LiFi transmission module 122 may be arranged to decode the coded data received by the PD array 121 to obtain the transmitted data, such that communication between electronic devices may be achieved.

To be noted that, while the first electronic device 110 and the second electronic device 120 are establishing communication, a handshaking between the first and the second electronic devices may be established first. A sender may transmit data, and a receiver may give a confirmation response after receiving the data. In response to the receiver not receiving the data within a certain period of time, the sender may automatically generate a timeout signal and re-send the data to ensure the receiver able to receive the data.

It may be explained that, in the present embodiment, when the first electronic device is sending the data, two or more second electronic devices may be available to receive the data at the same time. Therefore, the number of the second electronic devices shown in FIG. 1 is not limited, and, in FIG. 1, one second electronic device may be shown as an example to show achievement of the communication between electronic devices.

According to the present embodiment of the present disclosure, the communication system between electronic devices is provided and includes the first electronic device and the second electronic device. The LED array of the first electronic device may be able to work within the infrared spectrum. The first LiFi transmission module driving the LED array may be connected to the LED array, and may be arranged to code the data to be transmitted to generate coded data and send the coded data via the LED array. The PD array of the second electronic device may be aligning with the LED array and may be able to work within the infrared spectrum. The second LiFi transmission module for driving the PD array may be connected to the PD array, and may be arranged to decode the coded data received by the PD array to obtain the transmitted data. In such a way, the LED array and the PD array, which are both able to work within the infrared spectrum, may send and receive the data, such that data transmission between electronic devices at fixed points may be achieved. Further, an issue of a relatively short data transmission distance in the art may be solved, improving the transmission distance of data.

Figure 2:
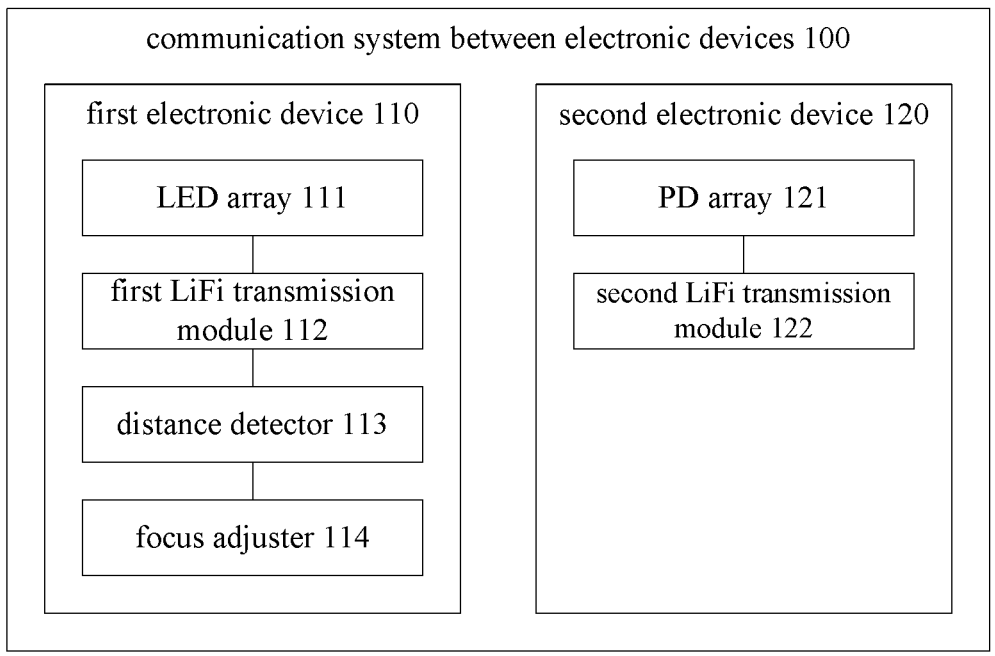
FIG. 2 is a structural diagram of a second communication system between electronic devices according to an embodiment of the present disclosure.

On the basis of the above-mentioned embodiment, as shown in FIG. 2, the first electronic device 110 may further include following components.

A distance detector 113 may be arranged to detect a distance between the first electronic device 110 and the second electronic device 120.

A focal length adjuster 114 may be arranged to adjust a focal length of the LED array 111. The first LiFi transmission module 112 may be arranged to adjust the focal length of the LED array 111 based on the distance between the first electronic device 110 and the second electronic device 120. Specifically, a focal length of a light source is negatively correlated with an area covered or irradiated by light emitted from the light source. The LED array 111 may include an array of LED lamps (i.e., light sources) and a reflection sheet configured to reflect the light emitted from the LED lamps. The focal length adjuster 114 may be connected to either the LED lamps or the reflection sheet. In such a way, when the distance between the first electronic device 110 and the second electronic device 120 is determined, the first LiFi transmission module 112 may control the focal length adjuster to move to adjust a distance between the reflection sheet and the LED lamps, such that the focal length of the LED array is adjusted. The focal length of the LED array may also be adjusted via the focal length adjuster by other means, such as controlling the LED lamps or the reflection sheet to move via a circuit, which will not be limited by the present disclosure.

In the present embodiment, based on the distance between the first electronic device 110 and the second electronic device 120 detected by the distance detector 113, the first LiFi transmission module 112 may be arranged to adjust the focal length of the LED array 111 based on the detected distance.

Under a potential situation, in response to the distance between the first electronic device 110 and the second electronic device 120 detected by the distance detector 113 being smaller than a first threshold distance, the first LiFi transmission module 112 may control the focal length adjuster 114 to adjust the focal length of the LED array 111 to be a first focal length, and drive the LED array 111 to send the coded data through the first focal length.

As an example, the first threshold distance may be preset to be 5 meters. For example, when the first electronic device 110 and the second electronic device 120 are located in a same meeting room, the distance detector 113 may detect the distance between the electronic device 110 and the second electronic device 120 being 3 meters, smaller than the first threshold distance. The first LiFi transmission module 112 may control the focal length adjuster 114 to adjust the focal length of the LED array 111 to be the first focal length, and drive the LED array 111 to send the coded data through the first focal length.

To be noted that, while the first LiFi transmission module 112 is controlling the focal length adjuster 114 to adjust the focal length of the LED array 111 and driving the LED array to send the coded data through the first focal length, the first electronic device 110 may transmit the coded data to a plurality of second electronic devices 120, and that is the one-to-many transmission may be achieved, improving an efficiency of data transmission and saving time. In response to the distance between the first electronic device 110 and the second electronic device 120 being smaller than 1 meter, a data transmission rate may not be less than 1 Gbps, such that fast data transmission in a short distance may be achieved.

Under another potential situation, when the distance detector 113 detects that the distance between the first electronic device 110 and the second electronic device 120 is greater than a second threshold distance, the first LiFi transmission module 112 may control the focal length adjuster 114 to adjust the focal length of the LED array 111 to be a second focal length, and may drive the LED array 111 to send the coded data through the second focal length. The second threshold distance may be greater than the first threshold distance, and the second focal length may be greater than the first focal length.

As an example, the second threshold distance may be preset to be 10 meters. When the distance detector 113 detects that the distance between the first electronic device 110 and the second electronic device 120 is 15 meters, greater than the second threshold distance, the first LiFi transmission module 112 may control the focal length adjuster 114 to adjust the focal length of the LED array 111 to be the second focal length, and may drive the LED array 111 to send the coded data through the second focal length. When the distance between the first electronic device 110 and the second electronic device 120 is greater than 10 meters, the data transmission rate may be not less than 100 Mbps, such that remote data transmission may be achieved.

In the present embodiment, the distance between the first electronic device and the second electronic device may be detected by the distance detector. In response to the distance between the first electronic device and the second electronic device being detected to be smaller than the first threshold distance, the first LiFi transmission module may control the focal length adjuster to adjust the focal length of the LED array to be the first focal length, and may drive the LED array to send the coded data through the first focal length. In response to the distance between the first electronic device and the second electronic device being detected to be greater than the second threshold distance, the first LiFi transmission module may control the focal length adjuster to adjust the focal length of the LED array to be the second focal length, and may drive the LED array to send the coded data through the second focal length. In such a way, the first LiFi transmission module may control the focal length of which the LED array sends the coded data based on the distance between the first electronic device and the second electronic device, such that data transmission between electronic devices with various distances may be achieved.

Figure 3:
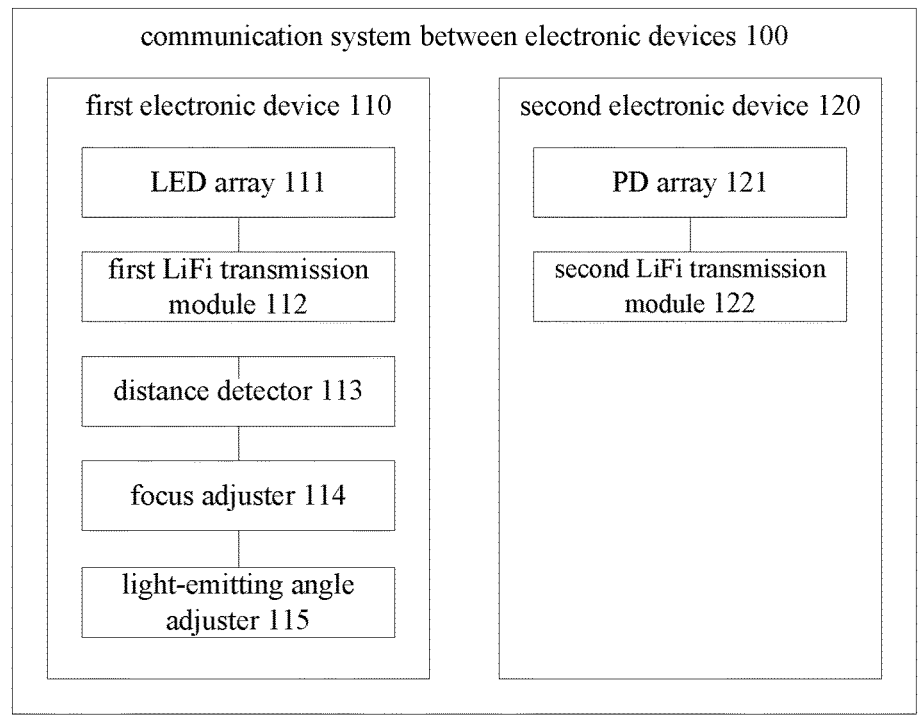
FIG. 3 is a structural diagram of a third communication system between electronic devices according to an embodiment of the present disclosure.

On the basis of the above-mentioned embodiment, as shown in FIG. 3, the first electronic device 110 may further include following components.

A light-emitting angle adjuster 115 may be arranged to adjust a light-emitting angle of the LED array 111.

The first LiFi transmission module 112 may further be arranged to acquire the number of second electronic devices 120 communicating with the first electronic device 110, and arranged to control the light-emitting angle adjuster 115 to adjust the light-emitting angle of the LED array 111 based on the number of the second electronic devices 120. Specifically, each LED lamp may emit light, and the light may transmit along an axis, the axis may be a light axis of the LED lamp. The electronic device may have a central line along a length direction of the electronic device. The light-emitting angle may refer to an angle between the light axis and the central line. When one second electronic device is detected as being aligned with the first electronic device, and that is, the central line of the second electronic device and the central line of the first electronic device are coincidence, the light-emitting angle of the LED array 111 may be 0. When a plurality of second electronic devices are detected as being located at various angles relative to the first electronic device, the first LiFi transmission module 112 may control the light-emitting angle adjuster 115 to adjust the light-emitting angle of the LED array 111, and that is, the light axis of each LED lamp may be tilted in a proper angle relative to the central line of the first electronic device, such that the light emitted from the LED array 111 may reach each second electronic device. The light-emitting angle of the LED array may be mechanically or electrically connected to the light-emitting angle adjuster 115, such that the LED array may be adjusted (i.e., controlled to be tilted). Alternatively, the light-emitting angle of the LED may be adjusted via the light-emitting angle adjuster 115 by other means, and will not be limited by the present disclosure.

In the present embodiment, the first LiFi transmission module 112 may acquire the number of second electronic devices 120 communicating with the first electronic device 110, and the light-emitting angle of the LED array 111 may be adjusted by the light-emitting angle adjuster 115 based on the number of second electronic devices 120, such that the first electronic device 110 may transmit data to various second electronic devices 120 located at various directions relative to the first electronic device 110 at the same time.

To be noted that, a structural composition of the second electronic device 120 may be the same as a structural composition of the first electronic device 110. Under such a situation, the second electronic device 120 may serve as the sender, and the first electronic device 110 may serve as the receiver, such that the second electronic device 120 may send data to the first electronic device, and a data transmission direction may not be limited herein.

In a potential scenario, in response to the number of second electronic devices 120, communicating with the first electronic device 110, obtained by the first LiFi transmission module 112 being smaller than a threshold number, the first LiFi transmission module 112 may control the light-emitting angle adjuster 115 to adjust the light-emitting angle of the LED array 111 to be a first light-emitting angle, allowing the LED array 111 to send the coded data within the first light-emitting angle, such that signal interference generated during data transmission in an excessive range may be avoided.

In another potential scenario, in response to the number of second electronic devices 120, communicating with the first electronic device 110, obtained by the first LiFi transmission module 112 being greater than the threshold number, the first LiFi transmission module 112 may control the light-emitting angle adjuster 115 to adjust the light-emitting angle of the LED array 111 to be a second light-emitting angle, allowing the LED array 111 to send the coded data within the second light-emitting angle. The second light-emitting angle may be greater than the first light-emitting angle.

To be noted that, when a large number of second electronic devices 120 are arranged, and when the light-emitting angle of the LED array 111 of the first electronic device 110 is relatively small, one or more of the large number of second electronic devices 120 may be arranged out of the light-emitting angle, such that the first electronic device 110 may fail to transmit data to the electronic device 120 arranged out of the light-emitting angle.

In the present embodiment, while transmitting data between electronic devices, the first LiFi transmission module may obtain the number of second electronic devices communicating with the first electronic device, and may control the light-emitting angle adjuster to adjust the light-emitting angle of the LED array based on the number of second electronic devices, such that the first electronic device may transmit data to various second electronic devices located at various directions relative to the first electronic device at the same time.

Figure 4:
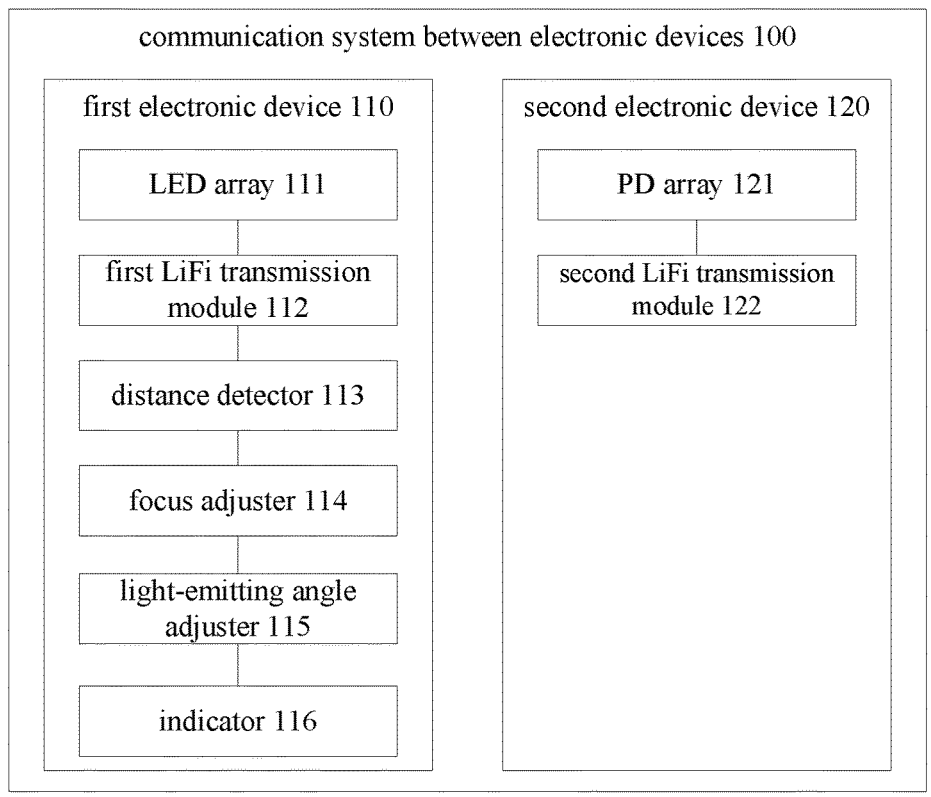
FIG. 4 is a structural diagram of a fourth communication system between electronic devices according to an embodiment of the present disclosure.

On the basis of the above-mentioned embodiment, as shown in FIG. 4, the first electronic device 110 may further include following components.

An indicator 116 may be arranged to emit a visible light, and the visible light may indicate a light-emitting direction of the LED array 111.

In the present embodiment, the first electronic device 110 and the second electronic device 120 may perform transmission symmetrically within the infrared spectrum. During establishing connection between the first and the second electronic devices, the indicator 116 of the first electronic device 110 may be arranged to emit the visible light to indicate the light-emitting direction of the LED array 111, enabling a user to align the first and the second electronic devices to establish the connection for data transmission.

To be noted that, in the above-mentioned embodiment, a structure of the first electronic device 110 may be adapted to the second electronic device 120, and will not be repeatedly described herein. While the first electronic device 110 and the second electronic device 120 are transmitting data within the infrared spectrum, the infrared spectrum may have a high capability of interference resistance, such that the efficiency of data transmission may be improved.

Figure 5:
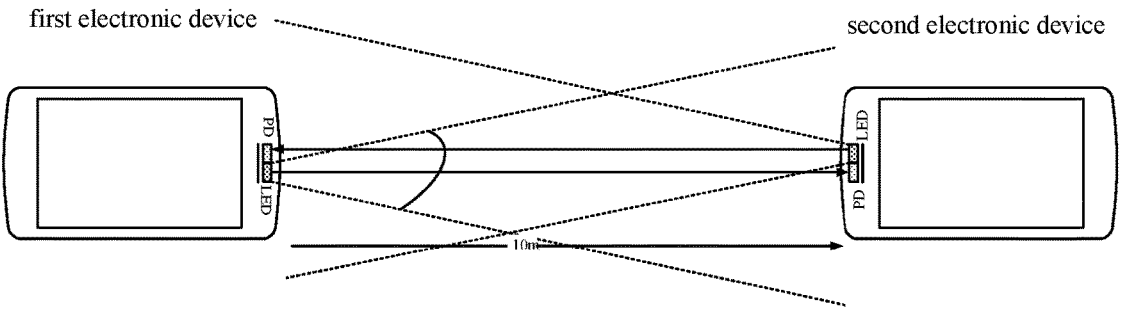
FIG. 5 is an example scenario of a communication system between electronic devices according to an embodiment of the present disclosure.

As an example, as shown in FIG. 5, the electronic device may be a mobile terminal, such as a smart phone. The structure of the first electronic device may be identical with the structure of the second electronic device. The LED array and the PD array may be arranged at a top or an end of the first electronic device, and the LED array and the PD array may be arranged at a top or an end of the second electronic device. A position of the LED array and a position of the PD array shown in FIG. 5 are just examples for illustration.

While two users are establishing connection between two electronic devices for communication, any one of the two users may align the top or the end of one of the first and the second electronic devices with the top or the end of the other of the first and the second electronic device. As a LED strip of the LED array may generate a beam and may be directional, a light spot in a large area may be formed during aligning for data transmission. Therefore, when a hand of the sender shakes slightly, the beam may shake to generate an aligning error, and the aligning error may not impact the data transmission.

Under a potential situation, the first electronic device may be the sender, and the second electronic device may be the receiver. Before the first electronic device sends the data, the distance detector may detect the distance between the first electronic device and the second electronic device. In response to the distance between the first electronic device and the second electronic device detected to be smaller than the first threshold distance, the first LiFi transmission module of the first electronic device may control the focal length adjuster to adjust the focal length of the LED array to be the first focal length, and may drive the LED array to send the coded data through the first focal length. In response to the distance between the first electronic device and the second electronic device detected to be greater than the second threshold distance, the first LiFi transmission module may control the focal length adjuster to adjust the focal length of the LED array to be the second focal length, and may drive the LED array to send the coded data through the second focal length. The second threshold distance may be greater than the first threshold distance, and the second focal length may be greater than the first focal length.

To be noted that, during communication between electronic devices, each of the first electronic device and the second electronic device may serve as both the sender to send the data and the receiver to receive the data, which will not be limited herein.

Figure 6:
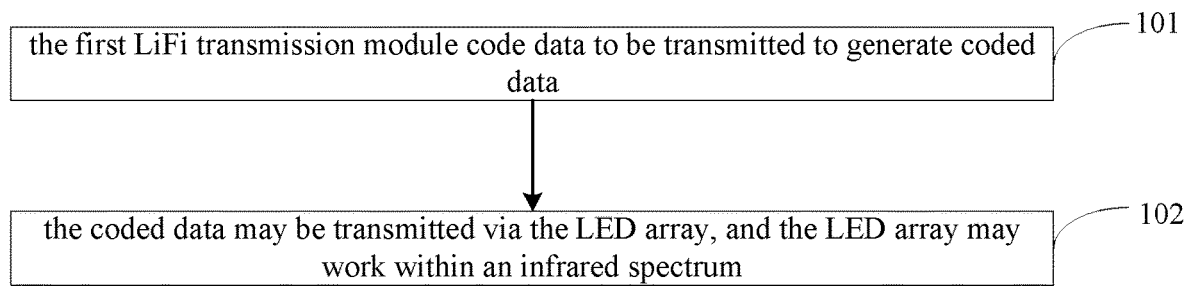
FIG. 6 is a flow chart of a communication method between electronic devices according to an embodiment of the present disclosure.

To achieve the above-mentioned embodiment, the present embodiment provides a method of communication between electronic devices. FIG. 6 provides a flow chart of the method of communication between electronic devices according to the embodiment of the present disclosure.

As shown in FIG. 6, the method of communication between electronic devices may include following operations.

In an operation of 101, a first LiFi transmission module may code data to be transmitted to generate coded data.

In the present embodiment, the data to be transmitted may be a text, a voice, an image, a file, and the like. The data to be transmitted may be data inputted by a user in a form of a voice or a text, or may be data stored locally in the electronic device, or may be data downloaded from a server, which will not be limited herein.

In the present embodiment, the first LiFi transmission module of the electronic device may code the data to be transmitted to generate coded data.

In response to the data being modified or lost during transmission, a present communication may be determined to be a failed communication. Therefore, the data to be transmitted may be coded to ensure validity of the data transmission.

In an operation of 102, the coded data may be sent via the LED array, and the LED array may work within an infrared spectrum.

According to the method of communication between electronic devices of the present embodiment, the first LiFi transmission module may code the data to be transmitted to generate the coded data, and the coded data may be sent via the LED array. The LED array may work within the infrared spectrum. In such a way, by coding the data to be transmitted to generate the coded data, and sending the coded data, security and validity of data transmission may be ensured.

To be noted that, during communication between electronic devices, communicative connection may be established first to achieve a handshaking between two electronic devices. A send may send the data, and a receiver may receive the data and give a confirmation response subsequently. In response to the receiver not receiving the data within a certain period of time, the sender may automatically generate a signal of timeout and re-send the data to ensure the receiver able to receive the data.

According to the method of communication between electronic devices of the present embodiment, the first LiFi transmission module may code the data to be transmitted to generate the coded data, and the coded data may be sent via the LED array. The LED array may work within the infrared spectrum. In such a way, by coding the data to be transmitted to generate the coded data, and sending the coded data, security and validity of data transmission may be ensured.

Figure 7:
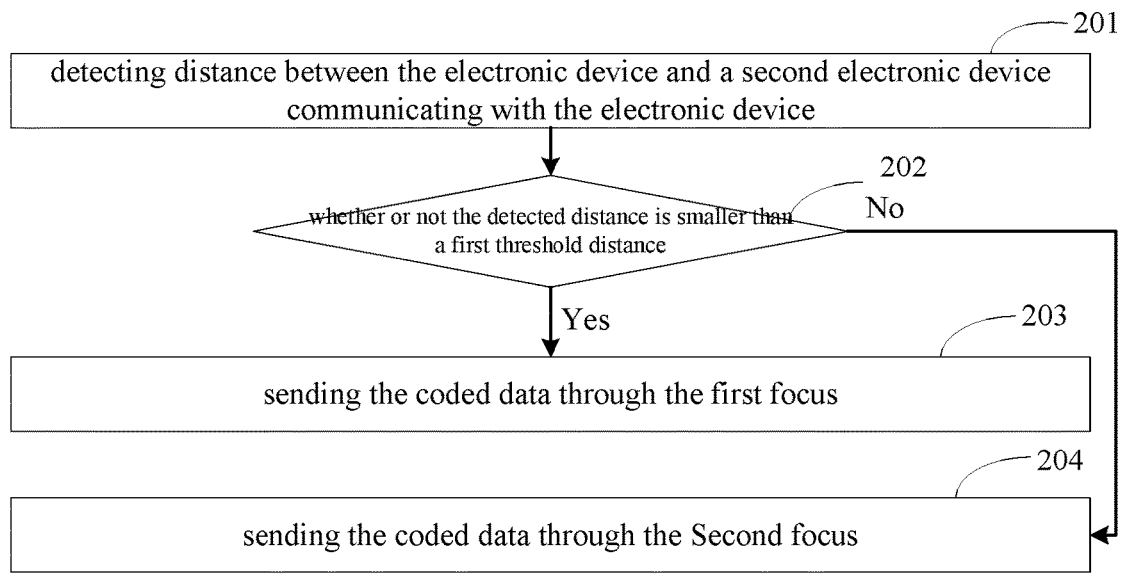
FIG. 7 is a flow chart of another communication method between electronic devices according to an embodiment of the present disclosure.

Under a potential situation, on the basis of the embodiment shown in FIG. 6, the present embodiment may further provide another method of communication between electronic devices. FIG. 7 provides a flow chart of another method of communication between electronic devices according to the present embodiment.

As shown in FIG. 7, the method of communication between electronic devices may include following operations.

In an operation of 201, a distance between the electronic device and a second electronic device communicating with the electronic device may be detected.

In the present embodiment, during communication between electronic devices, a distance detector arranged in the electronic device may detect the distance between the electronic device and the second electronic device communicating with the electronic device, and a focal length of which the LED array sends the coded data may be determined based on the detected distance.

In an operation of 202, the distance between the electronic device and the second electronic device may be determined to be smaller than a first threshold distance or not.

In the present embodiment, in response to the distance between the electronic device and the second electronic device being smaller than the first threshold distance, an operation of 203 may be performed. In response to the distance between the electronic device and the second electronic device being equal to or greater than the first threshold distance, an operation of 204 may be performed.

In the operation of 203, in response to the distance between the electronic device and the second electronic device being smaller than the first threshold distance, the coded data may be sent through the first focal length.

To be noted that, when the first LiFi transmission module may control the focal length adjuster to adjust the focal length of the LED array to be the first focal length and drive the LED array to send the coded data through the first focal length, the electronic device may transmit data to a plurality of second electronic devices, and that is, one-to-many transmission of data may be achieved, improving the efficiency of data transmission and saving time. In response to the distance between the electronic device and the second electronic device being smaller than 1 meter, a data transmission rate may not be lower than 1 Gbps, such that fast data transmission in a short distance may be achieved.

In the operation of 204, in response to the distance between the electronic device and the second electronic device being greater than a second threshold distance, the data may be transmitted through a second focal length.

In the present embodiment, the distance detector may detect the distance between the electronic device and the second electronic device. In response to the distance between the electronic device and the second electronic device being smaller than the first threshold distance, the first LiFi transmission module may control the focal length adjuster to adjust the focal length of the LED array to be the first focal length and may drive the LED array to send the coded data through the first focal length. In response to the distance between the electronic device and the second electronic device being greater than the second threshold distance, the first LiFi transmission module may control the focal length adjuster to adjust the focal length of the LED array to be the second focal length and may drive the LED array to send the coded data through the second focal length. In such a way, the first LiFi transmission module may control the focal length of which the LED array sends the coded data based on the distance between the electronic device and the second electronic device, such that data transmission between electronic devices located with various distances may be achieved.

Figure 8:
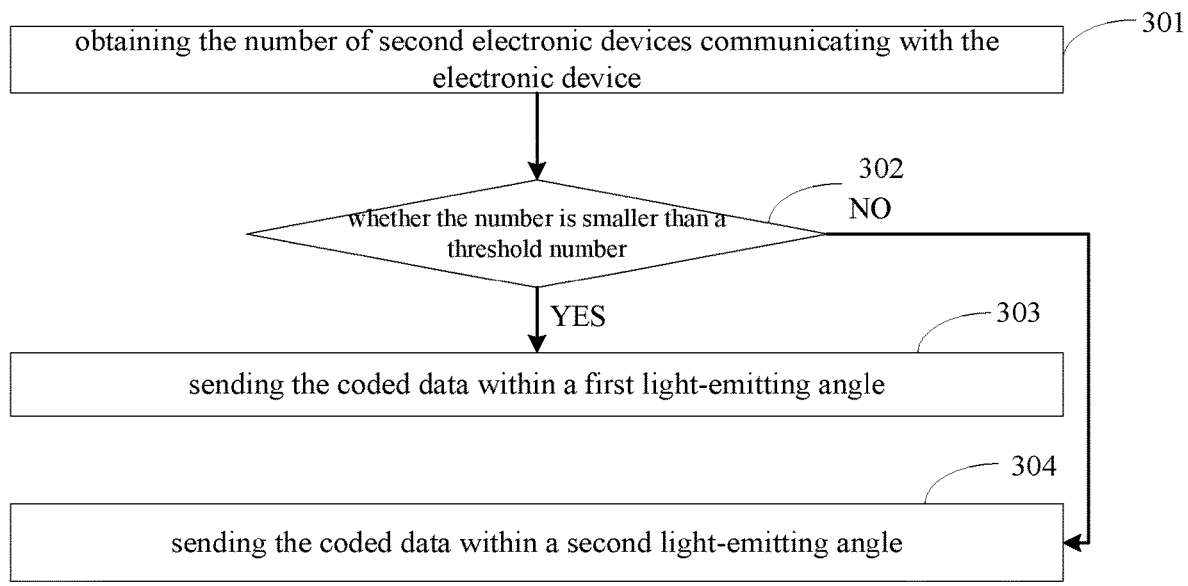
FIG. 8 is a flow chart of still another communication method between electronic devices according to an embodiment of the present disclosure.

Under a potential situation, on the basis of the embodiment shown in FIG. 6, the present embodiment may further provide still another method of communication between electronic devices. FIG. 8 may provide a flow chart of still another method of communication between electronic devices according to the embodiment of the present disclosure.

As shown in FIG. 8, the method of communication may include following operations.

In an operation of 301, the number of second electronic devices communicating with the electronic device may be obtained.

In the present embodiment, during communication between electronic devices, the first LiFi transmission module may obtain the number of second electronic devices communicating with the electronic device. Based on the number of second electronic devices, a light-emitting angle of the LED array may be adjusted, such that the electronic device may transmit data to a plurality of second electronic devices located at various directions relative to the electronic device at the same time.

In an operation of 302, the number of second electronic devices may be determined to smaller than a threshold number or not.

In an operation of 303, in response to the number of second electronic devices being smaller than or equal to the threshold number, the data may be transmitted within a first light-emitting angle.

In an operation of 304, in response to the number of second electronic devices being greater than the threshold number, the data may be transmitted within a second light-emitting angle.

The second light-emitting angle may be greater than the first light-emitting angle.

To be noted that, when a relatively large number of second electronic devices are available, and when the light-emitting angle of the LED array of the electronic device is relatively small, i.e., covering a relatively small area, a second electronic device may be located at a position out of the light-emitting angle, such that the electronic device may not be able to transmit data successfully to the second electronic device located at the position out of the range of the light-emitting angle.

In the present embodiment, during data transmission between electronic devices, the first LiFi transmission module may obtain the number of second electronic devices communicating with the electronic device. The light-emitting angle of the LED array may be adjusted by a light-emitting angle adjuster based on the number of second electronic devices, such that the electronic device may be able to transmit data to a plurality of second electronic devices located at various directions relative to the electronic device at the same time.

Figure 9:
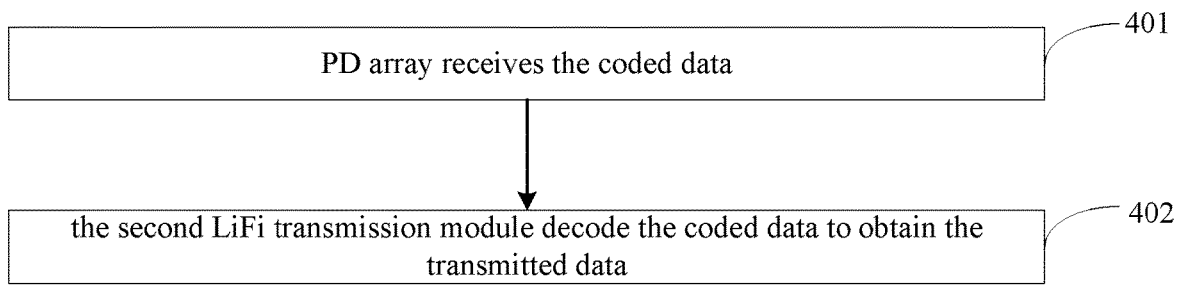
FIG. 9 is a flow chart of yet another communication method between electronic devices according to an embodiment of the present disclosure.

To achieve the above-mentioned embodiment, the present embodiment may provide still another method of communication between electronic devices. FIG. 9 provides a flow chart of a method of communication between electronic devices according to the present embodiment. As shown in FIG. 9, the method may include following operations.

In an operation of 401, a PD array may receive the coded data.

In the present embodiment, the electronic device may include the PD array and a second LiFi transmission module. The electronic device may receive the coded data sent by other electronic devices via the PD array.

In an operation of 402, the second LiFi transmission module may decode the coded data to obtain the transmitted data.

In the present embodiment, after the PD array of the electronic device receives the coded data, the second LiFi transmission module may decode the coded data to obtain the transmitted data.

According to the method of communication between electronic devices provided by the present embodiment, the coded data may be received via the PD array. The second LiFi transmission module may decode the coded data to obtain the transmitted data. In such a way, the second LiFi transmission module may decode the coded data received via the PD array to obtain the transmitted data, ensuring security and validity of data transmission.

Figure 10:
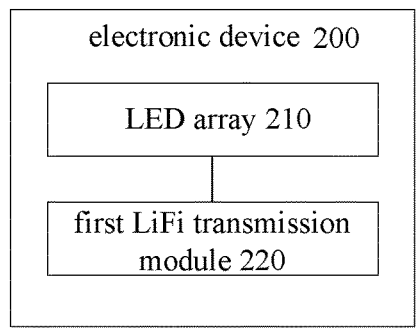
FIG. 10 is a structural diagram of an electronic device according to an embodiment of the present disclosure.

To achieve the above-mentioned embodiment, the present embodiment may provide an electronic device. FIG. 10 provides a structural diagram of the electronic device provided by the present embodiment.

As shown in FIG. 10, the electronic device 200 may include following components.

An LED array 210 may be arranged and may work within an infrared spectrum.

To be noted that, the LED array 210 works within the infrared spectrum, a distance of data transmission may be improved. The LED array 210 may be arranged at an end of the electronic device 200, such as a top or a bottom of the electronic device 200.

A first LiFi transmission module 220 may be arranged to code data to be transmitted to generate coded data and send the coded data via the LED array 210.

During data transmission between electronic devices, when the electronic device 200 transmits data, the first LiFi transmission module 220 may code the data to be transmitted to generate the coded data and send the coded data via the LED array 210.

Figure 11:
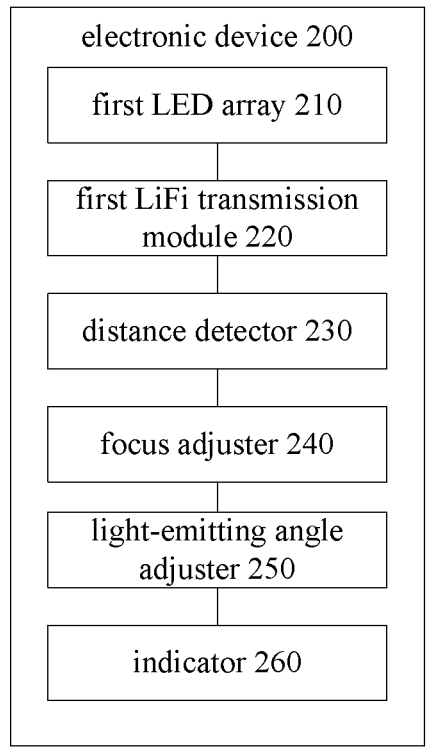
FIG. 11 is a structural diagram of another electronic device according to an embodiment of the present disclosure.

Under a potential situation, as shown in FIG. 11, the electronic device may further include following components.

A distance detector 230 may be arranged to detect a distance between the electronic device 200 and another electronic device communicating with the electronic device 200.

A focal length adjuster 240 may be arranged to adjust a focal length of the LED array 210. The first LiFi transmission module 220 may be arranged to adjust the focal length of the LED array 210 based on the distance between the electronic device 200 and the another electronic device communicating with the electronic device 200.

A light-emitting angle adjuster 250 may be arranged to adjust a light-emitting angle of the LED array 210.

In the present embodiment, the first LiFi transmission module 220 may be arranged to obtain the number of electronic devices communicating with the electronic device 200. The light-emitting angle of the LED array 210 may be adjusted by the light-emitting adjuster 250 based on the number of electronic devices, such that the electronic device 200 may be able to transmit data to a plurality of electronic devices located at various directions relative to the electronic device 200 at the same time.

Under another potential situation, as shown in FIG. 11, the electronic device 200 may further include following components.

An indicator 260 may be arranged to emit a visible light, and the visible light may indicate a light-emitting direction from the LED array.

According to the present embodiment, the electronic device may include the LED array and the first LiFi transmission module, and the first LiFi transmission module may be arranged to code the data to be transmitted to generate the coded data and send the coded data via the LED array. In such a way, by coding the data to be transmitted to generate the coded data and sending the coded data, security and validity of data transmission may be ensured.

Figure 12:
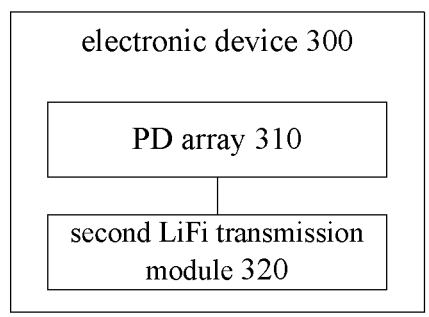
FIG. 12 is a structural diagram of still another electronic device according to an embodiment of the present disclosure.

To achieve the above-mentioned embodiment, the present embodiment may provide an electronic device. FIG. 12 provides a structural diagram of the electronic device according to the present embodiment.

As shown in FIG. 12, the electronic device 300 may include following components.

A PD array 310 may be arranged to work within an infrared spectrum.

To be noted that, the PD array 310 may be arranged at an end of the electronic device 300, such as a top or a bottom of the electronic device 300.

A second LiFi transmission module 320 may be arranged to decode the coded data received by the PD array 310 to obtain the transmitted data.

During data transmission between electronic devices, when the electronic device 300 is receiving data, after the PD array 310 of the electronic device 300 receives the coded data, the second LiFi transmission module 320 may decode the coded data received by the PD array 310 to obtain the transmitted data, such that communication between electronic devices may be achieved.

According to the present embodiment, the electronic device may include the PD array and the second LiFi transmission module, and the second LiFi transmission module is arranged to decode the coded data received by the PD array to obtain the transmitted data. In such a way, security and validity of data transmission may be guaranteed.

The embodiments of the present application are described in details. The principles and implementations of the present disclosure are described through specific examples. The description of the above embodiments is for the purposes to understand the method and core ideas of the present disclosure. An ordinary skilled in the art may perform modification on the specific embodiments and the scope of application based on the idea of the present disclosure. In summary, content of the present specification should not be construed as limiting the present disclosure.

What is claimed is:

1. A communication system between electronic devices, comprising:
   a first electronic device, comprising:
      a light emitting diode (LED) array, configured to be capable of working within an infrared spectrum;
      a first light fidelity (LiFi) transmission module, configured to drive the LED array, wherein the first LiFi transmission module is connected to the LED array, and is configured to code data to be transmitted to generate coded data and to send the coded data via the LED array;
      a distance detector, configured to detect a distance between the first electronic device and a second electronic device; and
      a focal length adjuster, configured to adjust a focal length of the LED array, wherein the first LiFi transmission module is configured to control the focal length adjuster to adjust the focal length of the LED array based on the distance between the first electronic device and the second electronic device; and
   the second electronic device, comprising:
      a photo diode (PD) array, configured to be capable of being aligned with the LED array and be capable of working within the infrared spectrum; and
      a second LiFi transmission module, configured to drive the PD array, wherein the second LiFi transmission module is connected to the PD array, and is configured to decode the coded data received by the PD array to obtain the transmitted data.

2. The communication system according to claim 1, wherein
   in response to the distance between the first electronic device and the second electronic device being smaller than a first threshold distance, the first LiFi transmission module is configured to control the focal length adjuster to adjust the focal length of the LED array to be a first focal length and drive the LED array to send the coded data through the first focal length; and
   in response to the distance between the first electronic device and the second electronic device being greater than a second threshold distance, the first LiFi transmission module is configured to control the focal length adjuster to adjust the focal length of the LED array to be a second focal length and drive the LED array to send the coded data through the second focal length, wherein the second threshold distance is greater than the first threshold distance, and the second focal length is greater than the first focal length.

3. The communication system according to claim 1, wherein the first electronic device further comprises:
   a light-emitting angle adjuster, configured to adjust a light-emitting angle of the LED array;
   wherein the first LiFi transmission module is further configured to obtain a number of second electronic devices communicating with the first electronic device and control the light-emitting angle adjuster to adjust the light-emitting angle of the LED array based on the number of second electronic devices.

4. The communication system according to claim 3, wherein
   in response to the number of second electronic devices being smaller than a threshold number, the first LiFi transmission module is configured to control light-emitting angle adjuster to adjust the light-emitting angle of the LED array to be a first light-emitting angle and drive the LED array to send the coded data within the first light-emitting angle; and
   in response to the number of second electronic devices being greater than a threshold number, the first LiFi transmission module is configured to control the light-emitting angle adjuster to adjust the light-emitting angle of the LED array to be a second light-emitting angle and drive the LED array to send the coded data within the second light-emitting angle, wherein the second light-emitting angle is greater than the first light-emitting angle.

5. The communication system according to claim 1, wherein the first electronic device further comprises:
   an indicator, configured to emit a visible light, wherein the visible light is arranged to indicate a direction of a light emitted from the LED array.

6. The communication system according to claim 1, wherein the LED array and the PD array are respectively arranged at an end of the first electronic device and an end of the second electronic device.

7. A method of communication between electronic devices, performed by an electronic device comprising a light emitting diode (LED) array and a first light fidelity (LiFi) transmission module, and the method comprising:
   coding, by the first LiFi transmission module, data to be transmitted to generate coded data; and
   sending the coded data via the LED array, wherein the LED array is able to work within an infrared spectrum, wherein sending the coded data via the LED array comprises:
      detecting a distance between the electronic device and a second electronic device, wherein the second electronic device is communicating with the electronic device;
      in response to the distance between the electronic device and the second electronic device being smaller than a first threshold distance, sending the coded data through a first focal length; and
      in response to the distance between the electronic device and the second electronic device being greater than a second threshold distance, sending the coded data through a second focal length, wherein the second threshold distance is greater than the first threshold distance, and the second focal length is greater than the first focal length.

8. The method according to claim 7, wherein the sending the coded data via the LED array further comprises:
obtaining a number of second electronic devices communicating with the electronic device;
in response to the number of second electronic devices being smaller than or equal to a threshold number, sending the coded data within a first light-emitting angle; and
in response to the number of second electronic devices being greater than the threshold number, sending the coded data within a second light-emitting angle, wherein the second range of the light-emitting angle is greater than the first range of the light-emitting angle.

9. The method according to claim 8, wherein the electronic device further comprises an indicator, and the indicator emits a visible light to indicate a direction of light emitted from the electronic device.

10. The method according to claim 7, wherein
the second electronic device comprises a photo diode (PD) array and a second LiFi transmission module; and
the method further comprises:
after the sending the coded data via the LED array:
receiving, by the PD array of the second electronic device, the coded data; and
decoding, by the second LiFi transmission module, the coded data to obtain transmitted data.

11. The method according to claim 10, wherein
the electronic device further comprises a PD array and a second LiFi transmission module, and the second electronic device further comprises a LED array and a first LiFi transmission module; and
the method further comprises:
coding, by the first LiFi transmission module of the second electronic device, data to be transmitted to generate the coded data;
sending, via the LED array of the second electronic device, the coded data to the electronic device;
receiving, by the PD array of the electronic device, the transmitted coded data; and
decoding, by the second LiFi transmission module of the electronic device, the coded data to obtain the transmitted data.

12. The method according to claim 11, wherein
the PD array of the electronic device and the LED array of the electronic device are arranged at an end of the electronic device, and the PD array of the second electronic device and the LED array of the second electronic device are arranged at an end of the second electronic device.

13. An electronic device, comprising:
a light emitting diode (LED) array, configured to be capable of working within an infrared spectrum;
a first light fidelity (LiFi) transmission module, configured to code data to be transmitted to generate coded data and send the coded data to a receiver via the LED array;
a distance detector, configured to detect a distance between the first electronic device and the receiver; and
a focal length adjuster, connected to the distance detector and configured to be controlled by the first LiFi transmission module to adjust a focal length of the LED array based on the distance detected by the distance detector.

14. The electronic device according to claim 13, further comprising:
a light-emitting angle adjuster, configured to adjust a light-emitting angle of the LED array.

15. The electronic device according to claim 13, further comprising:
an indicator, configured to emit a visible light, wherein the visible light is able to indicate a direction of a light emitted from the LED array.

16. The electronic device according to claim 13, wherein
the LED array is capable of aligning with a photo diode (PD) array arranged in another electronic device to send the coded data to the PD array of the other electronic device; and
the other electronic device is capable of being arranged with a second LiFi transmission module decoding the coded data received by the PD array to obtain the transmitted data.

17. The electronic device according to claim 16, wherein the LED array and the PD array are respectively arranged at an end of the electronic device and an end of the other electronic device.

* * * * *